April 29, 1930.   F. E. GARBUTT   1,756,426
PHOTOGRAPHIC PRINTING
Filed Nov. 28, 1927
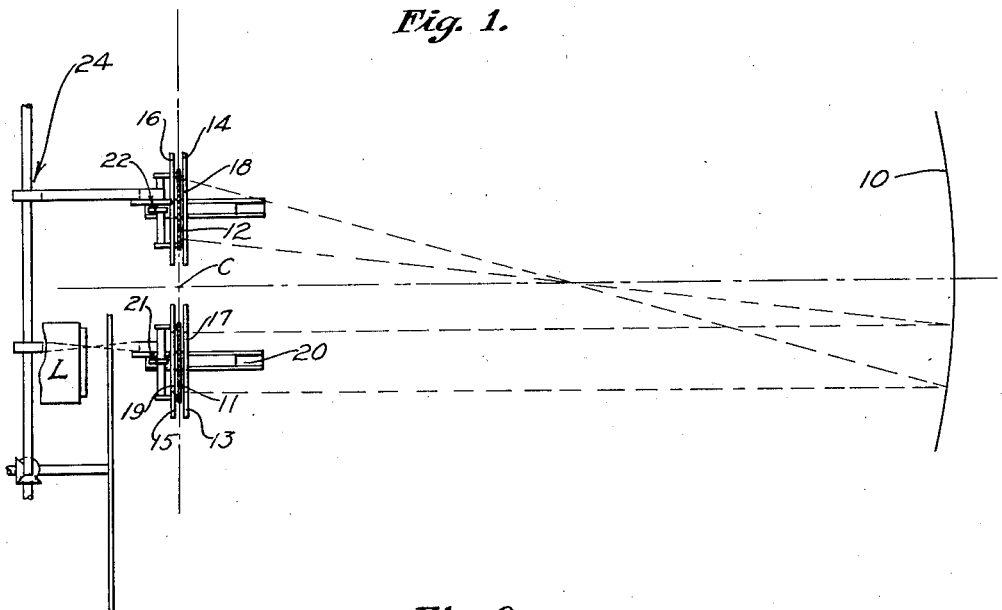
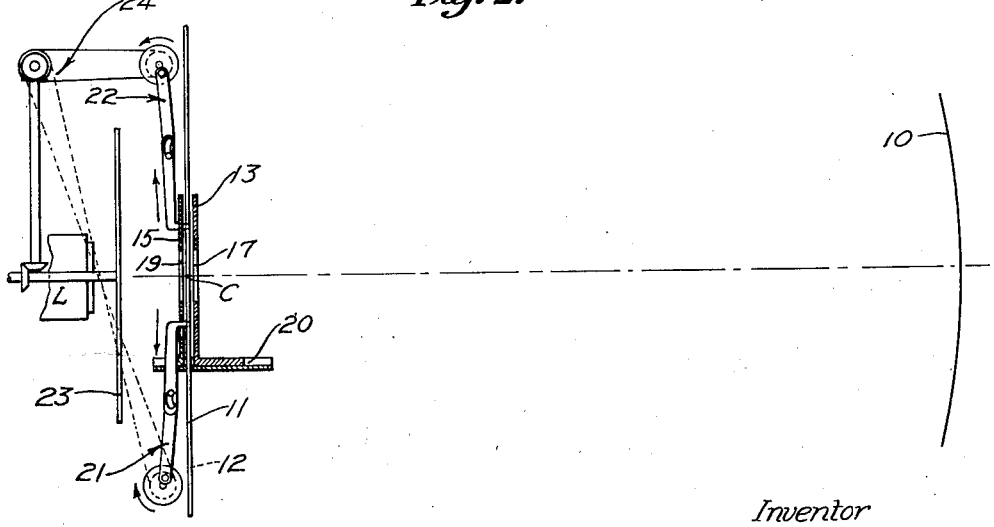
Inventor
Frank E. Garbutt
Attorney Patented Apr. 29, 1930

1,756,426

UNITED STATES PATENT OFFICE

FRANK E. GARBUTT, OF LOS ANGELES, CALIFORNIA

PHOTOGRAPHIC PRINTING

Application filed November 28, 1927. Serial No. 236,140.

This invention has to do with printers for motion picture film and the like, and is particularly concerned with an improved system of printing by the projection method.
It is an object of this invention to provide a system of printing in which light dispersion is eliminated, thus allowing the printing of a positive film, for instance, without losing any of the detail of the original negative.
There are now two general methods of printing in common use. In the method of printing by contact, in which light transmitted through a developed film prints an adjacent raw film, the light rays are dispersed in passing through the first film due to dispersion, refraction, etc., and when they finally reach the raw film they have become distorted and dispersed so that a faithful print is impossible.
In projection printing a real image of the picture of the developed film is thrown by means of a refraction lens upon the undeveloped film. This system is an improvement over the method of contact printing because of the fact that the light rays falling upon the raw film are not affected by dispersal in the developed film; for in this case the lens forms a real image of the developed film at the surface of the raw film, a light being used in this case only to illuminate the developed film. This system also causes loss of definition, however, by reason of the use of a refraction lens, which inevitably introduces chromatic aberration and light dispersal within itself. Therefore, in this system also, the obtaining of a duplicate negative or positive as perfect as the original negative has been impossible.
In present practice, it is common to first make one or two original negatives, and then print the required number of projection positives from these negatives. If a "duplicate" negative is made from a positive, and then the projection positives printed from that duplicate, the definition of the final positives becomes very poor, due to the cumulative definition losses in successive printings. In other words, a duplicate negative made by present practices is not a true enough reproduction of the original to be practically usable; and hence arises the inordinately large valuation necessarily attached to the original, and also the expensive procedure of taking two original negatives and then most carefully preserving them. The insurance cost alone is a considerable item.
My invention provides a system in which an image forming mirror projects a real image upon the raw film, no refraction lenses being used in the entire system, and therefore no light dispersion or chromatic aberration being allowed to distort the image. This system makes possible the printing of a film without losing detail or definition in the slightest degree.
It will be apparent that a great economic saving both in time and money is effected with the provision of the system of this invention. A perfect master positive is now obtainable, and from this may be printed duplicate negatives which are in every way as perfect as the original negative. Instead of having only one or two perfect and extremely valuable negatives, which must be handled with every precaution and heavily insured against loss, any desired number of perfect negatives are obtainable, and the original negative is only extremely valuable until a master positive has been printed from it. To be entirely safe, it may still be thought advisable in some cases to operate with the use of two cameras to safeguard against accident to a film before the first positive is made from it; but even in that case my invention provides for substantial savings.
The other great advantage of this system is that perfect projection positives containing all of the sharpness and detail of the original negative are obtainable. If a certain amount of diffusion is then thought to be desirable, this can be effected and accurately regulated by any suitable means.
I do not wish to limit myself to the specific manner or means of carrying out my invention as shown in the accompanying drawings and described in the following detailed specification, these being utilized for illustrative purposes only, and all equivalent arrangements being contemplated within the invention.

In the drawings:

Fig. 1 illustrates, in diagrammatic form, an arrangement of means to carry out the system of the invention;

Fig. 2 is a side elevation, partly in section, of the arrangement of Fig. 1.

It is to be understood that the particular units shown and pointed out are merely illustrative of suitable means for carrying out the invention, and that I contemplate the use of any equivalents therefor.

For the sake of clearness in the following description, it will be hereafter assumed that a positive is to be printed from a negative, it being obvious that a negative may be printed from a positive in exactly the same manner. With particular reference to Fig. 1, the printing system consists of a spherical or otherwise figured mirror 10, means for supporting and moving a developed negative film 11 and a raw positive film 12 side by side in opposite directions in a plane substantially through the center of curvature C of the spherical mirror, and a source of light L which is used to illuminate the picture on the negative 11. The source of light L consists of any light emitting source which is directed to illuminate the negative film, and while it is preferably and most conveniently positioned as shown, it may be arranged or positioned in any other manner, just so that the film 11 is so illuminated that the mirror may form an image of it upon the raw film 12. Aperture plates 13 and 14 are provided in front of the negative and positive films respectively, and gates 15 and 16 are correspondingly placed behind the films, the aperture plates having apertures 17 and 18 and the gate 15 having an aperture 19. The numeral 20 indicates ways or other adjusting means for shifting the position of the two films backward or forward with the respect to the reflecting mirror 10.

Either a continuous or an intermittent movement of the film may be used in this system. In this illustration, the film moving means 11 consists of a well known intermittent movement, as illustrated, the negative film 11 and positive film 12 being clawed in opposite directions by the synchronously operated claw mechanisms 21 and 22, respectively, as will be understood. As far as the system of the invention is concerned, however, a continuous movement of the film might just as well be employed. If the intermittent movement is utilized, a shutter 23 synchronously driven with the film moving means is provided between the source of light L and the negative 11, thus cutting off the light while the films are moved from frame to frame, as is well understood in the art. The film moving means and shutter are synchronously driven by any suitable mechanism, as indicated at 24.

If a relatively long focus mirror is used, of a five foot focal length for instance, and the films are positioned close together, the angle between the incident ray and the reflected ray is so small that spherical aberration will not be present. The reflective surface of the mirror is at its face, so that the light rays do not pass through any refractive material throughout the system.

The operation of the system is then as follows: After the frames of negative 11 and positive 12 are simultaneously clawed into position before their apertures, the shutter 22 opens and allows light from the source L to illuminate the negative. Both films being properly positioned in a plane through the center of curvature of the spherical mirror 10, a real image of the negative 11 is formed upon the raw positive 12. The two films are disposed in the planes of conjugate foci of the mirror 10, and are in those planes which are substantially at the center of curvature of the mirror so that the image formed on the positive will be of substantially the same size as the negative. If the negative film is slightly forward from this position, the positive must be moved a corresponding distance backward, and the image on the positive will be slightly larger than the original negative, as will be understood from the simple theory of spherical mirrors. It is thus possible, by utilizing the adjusting means 20, to compensate for shrinkage in the negative by merely adjusting the position of the films with respect to the mirror, moving the negative closer and the positive backward from the plane of the center of curvature, but keeping the two films always in planes of conjugate foci of the mirror.

The films are then clawed frame by frame in opposite directions by the synchronously acting intermittent movements 20 and 21. The shutter 22 opens between movements of the film and permits light from the source L to illuminate the negative, images of the negative being formed on the raw positive and thus printing it. The films must be moved in opposite directions because of the fact that the image is inverted as well as reversed by the spherical mirror.

The image formed upon the positive will not be distorted due to dispersion of light passing through the negative, for the function of the light rays is not to pass through the film in parallel lines, but merely to illuminate the negative, an image of which prints the raw positive. And, further, an image forming mirror being used instead of a refractive lens system, no dispersion of light or chomatic aberration is caused by this unit, and a perfect image is formed at the positive.

Duplicate negatives may be produced by this system which are so perfect that for all practical purposes they may be regarded as exact reproductions of the original negative. Projection positives may be obtained without losing the detail of the original negative in the slightest degree.

While I have specified a spherical mirror, any form of mirror capable of forming a real image may be utilized. The spherical mirror is, in fact, preferably figured to a parabolic shape, much as an astronomical reflecting lens, and the spherical mirror mentioned throughout the specificatoin implies this type.

I claim:

1. In a system of optical printing of motion picture film, the combination of a real image forming mirror, interconnected and synchronously driven means for moving a film strip having a series of developed images thereon and a raw film strip side by side in opposite directions in planes located on the same side of the said mirror and through substantially equal conjugate foci thereof, an aperture plate between said developed film strip and said mirror having an aperture through which a limited portion of the image area of the moving developed film strip is visible from the said mirror, and means for illuminating the image area of the developed film strip at the aperture whereby a real image thereof will be formed and printed by said mirror upon a corresponding portion of said oppositely moving raw film strip.

2. In a system of optical printing of motion picture film, the combination of a real image forming mirror, interconnected and synchronously driven means for moving a film strip having a series of developed images thereon and a raw film strip in opposite directions in planes located on the same side of the said mirror and through conjugate foci thereof, an aperture plate between said developed film strip and said mirror having an aperture through which a limited portion of the image area of the moving developed film strip is visible from the said mirror, and means for illuminating the image area of the developed film strip at the aperture whereby a real image thereof will be formed and printed by said mirror upon a corresponding portion of said oppositely moving raw film strip.

In witness that I claim the foregoing I have hereunto subscribed my name this 10 day of November, 1927.

FRANK E. GARBUTT.